Patented June 17, 1952

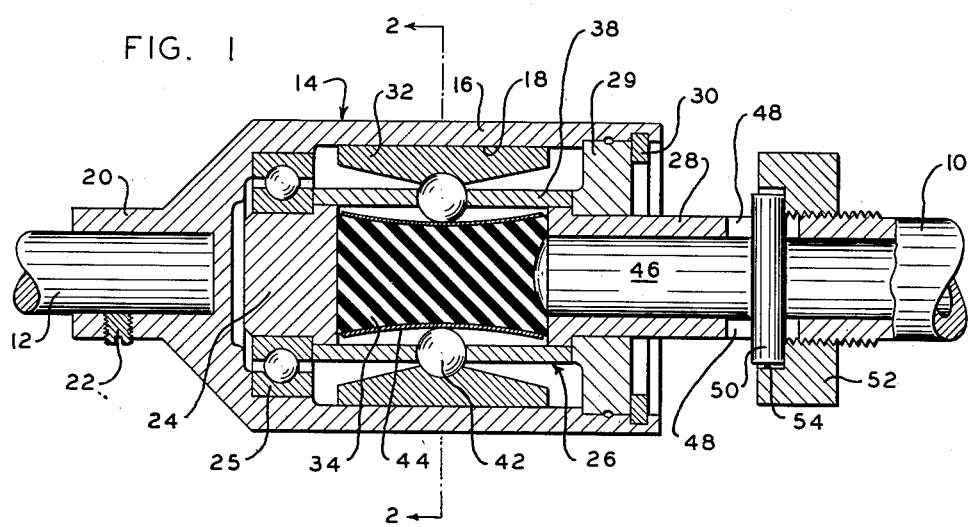
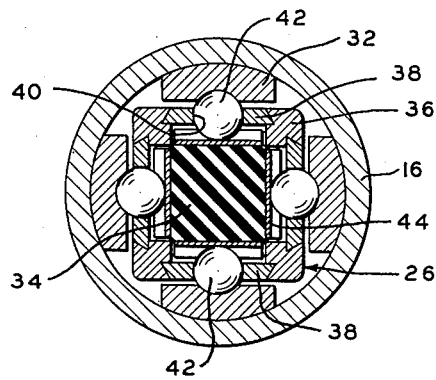
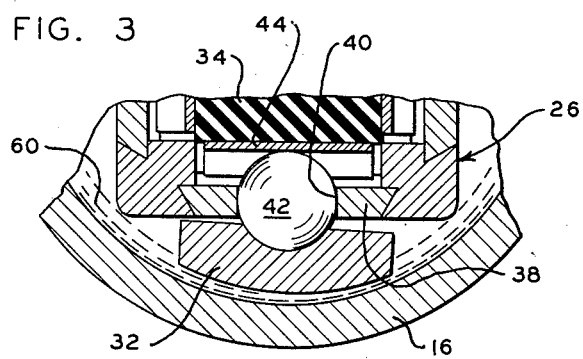

2,601,012

UNITED STATES PATENT OFFICE 2,601,012

SAFETY COUPLING

Otto E. Wolff, Cambridge, Mass., assignor of one-fourth to Polaroid Corporation, Cambridge, Mass., a corporation of Delaware Application August 8, 1947, Serial No. 767,474

12 Claims. (Cl. 64—30)

This invention relates to torque-transmitting devices and more particularly to novel and improved coupling or clutch means for transmitting torque between two members which are capable of relative rotation with respect to one another.

One object of the present invention is to provide a novel torque-transmitting device for transmitting torques up to a predetermined torque between a pair of members adapted for relative rotation with respect to one another, said device being of a type adapted to effect substantially complete and frictionless disengagement between the two interconnected members when said predetermined torque is exceeded.

Another object is to provide a safety coupling or clutch adapted to connect a driven member such, for example, as the work-engaging element of a power tool to a driving member such as the motor of said tool in such manner that when the driven member is subjected to a resistance which applies thereto a torque in excess of a predetermined torque, transmission of torque between the driving member and the driven member is substantially completely discontinued.

Still another object is to provide a coupling or clutch of the above character wherein re-engagement of the driven and driving members is automatically obtained, after removal of the torque in excess of the maximum torque which can be transmitted by said coupling, by bringing said members to the same rotational speed as, for example, by bringing both members to rest.

A further object is the provision of a novel torque-transmitting device for transmitting torques between a pair of rotary members in which a plurality of shoes are provided for frictionally engaging a shoe-engaging surface and wherein there is provided a novel pivotal mounting for the shoes and novel means for urging the shoes into frictional engagement with the shoe-engaging surface.

Still another object is the provision of a novel clutch or coupling of the above character which is simple, compact and reliable in operation, and which can be readily and economically manufactured and assembled.

The invention accordingly comprises the features of the construction, combination of elements and arrangements of parts which will be exemplified in the construction hereinafter set forth and the scope of the application of which will be indicated in the claims.

For a fuller understanding of the nature and objects of the invention, reference should be had to the following detailed description taken in connection with the accompanying drawings, in which:

Figure 1 is a sectional view of one type of power tool adapted to embody the novel clutch or coupling of the present invention, the section being taken along the axis of rotation of the rotary elements of said tool;

Fig. 2 is a sectional view taken substantially along line 2—2 of Fig. 1; and

Fig. 3 is an enlarged fragmentary sectional view of the portion of the structure of Fig. 2 showing the frictional surfaces of the coupling in disengaged position.

Referring to the drawings, the novel power-transmitting device of the present invention is illustrated by way of example in the form of a self-contained, relatively simple and compact unit which may be readily adapted to interconnect a pair of rotary members and to serve as a safety clutch or coupling for said members.

In the form shown, the coupling is adapted to interconnect the driving shaft 10 of a power tool such, for example, as a power driven screw driver to the screw driver element 12, the driving shaft being driven, for example, by a suitable electric motor, not shown. It is to be expressly understood, however, that the novel structure of the invention is not limited to the transmission of a torque from a power driven shaft to a tool member, but may be utilized to transmit torque between any members adapted for angular rotation with respect to another, as, for example, to transmit torque from a shaft to a pulley, or from a driving shaft to a driven shaft of a transmission.

In the specific form illustrated, the torque-transmitting device of the invention comprises a housing member 14 which includes a substantially cylindrical peripheral portion 16 whose inner periphery provides a substantially continuous shoe-engaging surface 18. At one end of said housing there is provided a tool-engaging member 20 which is preferably an integral extension of said housing and is provided with a bore coaxial with the shoe-engaging surface 18 for receiving one end of a tool element such, for example, as a screw driver element 12, the latter being rigidly fixed in said member as by means of a set screw 22. Projecting into the open end of housing 14 is an extension of driving shaft 10 comprising, preferably as integral parts thereof, an inner cylindrical end section 24, a polygonal portion 26 (to be more fully described hereinafter) adjacent said end section, and another cylindrical section 28 on the other side of said polygonal section. Inner cylindrical end 24 of said extension is mounted in a suitable thrust ball bearing 25, which is, in turn, mounted in the end of said housing adjacent tool-receiving member 20. A shoulder provided by polygonal portion 26 of said extension engages the inner end of bearing 25 and the corresponding shoulder at the other end of said polygonal portion bears against the inner end of a suitable bushing 29 mounted as by means of a snap ring 30 in housing 14 and having journaled therein cylindrical portion 28 of said shaft extension.

To transmit torque from shaft 10 to housing 14 and thence to element 12, there is provided a plurality of shoes 32 mounted for rotation with said shaft 10, and in the form shown four such shoes are used and are pivotally mounted on polygonal portion 26, the latter being square in cross-section, a mount for one shoe being provided on each side thereof.

Portion 26 is hollowed out, preferably by having a pair of axial slots cut therethrough, thereby forming therein a longitudinally extending chamber for receiving a block 34 of a yieldable material which does not appreciably change its volume under pressure, such as natural vulcanized rubber. Four corner sections 36 are thus also formed in portion 26, and pairs thereof are adapted to slidably mount in dovetail grooves four plate-like members 38 whose upper surfaces are preferably flush with the outer surfaces of said portion 26, each said plate-like member being provided with a central circular hole 40, which is adapted to mount a ball member 42. Each of said ball members is adapted to serve as a pivotal mount for one of shoes 32, the latter being provided with a groove or indentation having a conforming spherical surface for receiving the upper portion of said ball member, shoes 32 being thus free for limited universal pivotal movement. Mounted beneath each of plate members 38 between each of ball members 42 carried by said plate members and block 34 are a plurality of plates 44 of a suitable rigid material, such as a spring steel, said plates being substantially rectangular in shape and having their long edges guided between the faces of corner sections 36 of portion 26. As a result of this arrangement, when block 34 is under compression, it transmits that compression through spring plates 44 to balls 42, which in turn transmit the pressure to shoes 32, tending to urge the latter into frictional engagement with shoe-engaging surface 18, the normal pressure exerted by the said shoes and said surface being a function of the amount of compression applied to said block 34.

Block 34 is preferably formed of a natural vulcanized rubber of the type which may be subjected to substantial compression without taking on a permanent set. The hardness may, for example, be of the order of 40 to 50 durometer units, although it is not in any respect critical. While a natural vulcanized rubber having the above characteristics is preferred, it is equally possible to use synthetic products such as the buna rubbers, and particularly such synthetic rubbers as Buna N or neoprene. The term "rubber-like material" as used herein is to be expressly understood to be generic to that class of materials which possesses properties generally analogous to the properties of natural vulcanized rubber, i. e., a yieldable material adapted, when subjected to compression along one axis in a confined space, to apply pressure radially of said axis in contradistinction to such relatively rigid materials, for example, as the metals, which will tend to transmit a compressive force applied thereto only in the direction of application thereof.

A novel feature of the construction of the present invention is the provision between each ball member 42 and block 34 of one of plates 44 formed of a rigid material such as metal, which plate may bend around said ball member to provide for variations in the shape of said block when the latter is subjected to compression while transmitting all of the radial pressure exerted by said block to said ball member.

To maintain block 34 under compression, shaft 10 is preferably hollow, and in the end thereof which connects with the interior of portion 26 a rod 46 is preferably mounted, said rod engaging one end of said block so that axial movement of said rod in the direction of member 26 compresses said block. To control the movement of said rod and to maintain the same in a given position, a pair of diametrically opposed, rectangular slots 48 are provided in shaft 10, and in said slots there is mounted a pin 50 which extends radially of said shaft and engages the end of said rod remote from block 34. Pin 50 is held in said slots by a nut member 52 which is threaded on an externally threaded portion of shaft 10, said nut member being provided with an annular groove 54 which receives said pin and fixes the same against radial movement while permitting the rotation of said nut member with respect to said pin, said rotation moving said pin axially and transmitting said movement in turn to rod 46, the latter thereby varying the compression under which said block is held. This provides for a ready and convenient adjustment of the pressure which normally urges shoes 32 into engagement with shoe-engaging surface 18 and thereby controls the maximum torque transmittable by the coupling of the present invention, that is, the maximum torque which can be transmitted from shaft 10 to screw driver element 12.

The foregoing coupling construction is particularly adapted to effect substantially complete disengagement between the driving shaft 10 and screw driver element 12 when the predetermined maximum transmittable torque for which it is set is exceeded, the disengagement being such that re-engagement will not occur until there is no relative rotation between said members as, for example, when both are at rest. In order to achieve this result, a lubricant is preferably provided in the chamber formed within housing member 14. It is to be noted that only one end of said chamber is open and said open end is rendered substantially fluid tight by means of bushing 29 and cylindrical extension 28 of shaft 10 whose periphery said bushing engages. Shoes 32 are preferably formed of metal, and when so formed the lubricant used is preferably an oil, and a quantity thereof is provided within housing 14 sufficient to cover shoe-engaging surface 18 with a film thereof during rotation of the coupling.

When the maximum transmittable torque is exceeded and shoes 32 begin to slip, relative to surface 18, this slipping action, because of the pivotal mounting of said shoes, will cause the latter to tilt somewhat about an axis substantially perpendicular to the direction of rotation thereof, i. e., about an axis substantially parallel to the axis of rotation of shaft 10, thereby producing a wedge effect between the friction surfaces. When this wedge action takes place, a lubricating film 60 of the oil within housing 14 is forced between said engaging surfaces and in effect produces a complete separation of said surfaces, as illustrated in somewhat exaggerated fashion in Fig. 3. Substantially no torque can be transmitted from the driving member to the driven member while this condition exists, which is as long as shoes 32 are rotating at a different angular velocity than housing 14. Re-engagement of the friction surfaces for the purpose of effecting a power transmission from shaft 10 to tool element 12 is not achieved until there is no relative rotation between said shaft and said tool element. Under normal operating conditions, in order to effect re-engagement between the frictional surfaces so as to make possible the further power transmission from the driven to the driving members, it is necessary to bring said members to rest or to completely unload the driven member, i. e., tool element 12, so that the drag of lubricating film 60 is sufficient to bring the latter element to the speed of the driving member.

In general, when one surface slides over a conforming surface in the presence of a lubricant, as when the shoes are slipping, the distribution of pressure in the lubricant depends on the bearing pressure, speed, viscosity of the lubricant, the geometry of the surfaces, and the method of support. The ratio of the free slipping torque to the torque which causes slipping varies with speed and viscosity, but is normally of the order of one per cent or less. The static frictional coefficients depend, of course, on the materials and the characteristics of the surfaces, but do not vary a significant amount for a given pair of materials. Shoes 32 may be of plastic or rubber, but in the above-described embodiment are preferably of metal, and lubricants may be straight mineral oils. Oiliness additives are in general undesirable, but anti-oxidants, antifoam, and extreme pressure agents may be added. The lowest viscosity which will give adequate lubrication is preferred, in order to minimize the free slipping torque. Water and aqueous solutions may be used with rubber shoes. Water appears to be an adequate lubricant where speeds are high or the load is light. Metal shoes, for example, of steel, may take loads up to five-hundred pounds per square inch.

In the above-described embodiment of the invention, shoes 32 are pivoted centrally on the ball members 42, and this provides for operation of the coupling in either direction. Where the unit is to operate in one direction only, the free slipping torque may be reduced somewhat by pivoting the shoes closer to their trailing edges.

There is thus provided a novel torque-transmitting device useful particularly as a coupling and embodying novel means for mounting friction members for operative engagement with one another and novel means for automatically effecting substantially complete disengagement of said members when a predetermined torque is exceeded. There is also provided novel means for controlling the frictional engagement between the friction members so as to vary the maximum torque which can be transmitted.

Since certain changes in the constructions set forth which embody the invention may be made without departing from its scope, it is intended that all matter contained in the above description, or shown in the accompanying drawings, shall be interpreted as illustrative and not in a limiting sense.

What is claimed is:

1. In a device for transmitting torque, a pair of members adapted for rotation with respect to one another, one of said members providing a shoe-engaging surface, a plurality of friction shoes adapted for frictional engagement with said shoe-engaging surface, a hollow, polygonal member connected to the other of said members, a mount provided in each side of said polygonal member for pivotally mounting one of said shoes, a member of rubberlike material contained in said polygonal member, a resilient platelike member interposed between said member of rubberlike material and each said mount and adapted to transmit forces from said rubberlike member to said mount, and means carried by said polygonal member for engaging said rubberlike member and for holding the same under compression to cause the latter to apply a force tending to press said shoes into engagement with said shoe-engaging member.

2. In a device for transmitting torque, a pair of members adapted for rotation with respect to one another about a predetermined axis, one of said members providing a friction surface, means cooperating with said first-named member to provide a fluid-tight housing which has friction surface on the interior thereof, said housing containing a lubricant adapted to cover said friction surface during operation of said device, and means within said housing connected to the other of said members for frictionally engaging said surface, said last-named means comprising a plurality of friction shoes normally in engagement with said friction surface, a plurality of mounts, each mount pivotally mounting one of said friction shoes, supporting means for said mounts rigidly secured to said other member, a member of rubberlike material contained within said supporting means, a plurality of resilient members, each said resilient member being interposed between one of said shoe mounts and said member of rubberlike material and adapted to transmit pressure from the latter member to said mount, and compression applying means carried by said other member and having at least a portion thereof within said housing and in engagement with said member of rubberlike material, said compression-applying means holding said member of rubberlike material under a predetermined compression and thereby controlling the force with which said shoes are urged into engagement with said friction surface, said shoes being adapted to pivot on said mounts at least about axes perpendicular to their direction of rotation and said lubricant being capable of disengaging said shoes from said surface whenever there is relative rotation between said shoes and said surface.

3. In a device for transmitting torque, a pair of members adapted for rotation with respect to one another about a predetermined axis, one of said members providing a friction surface, means cooperating with said first-named member to provide a fluid-tight housing, said housing containing a lubricant adapted to cover said shoe-engaging surface during operation of said device, and means connected to the other of said members for frictionally engaging said surface, said last-named means comprising a plurality of friction shoes, a plurality of mounts, each mount pivotally mounting one of said friction shoes, supporting means for said mounts rigidly secured to said other member, a member of rubberlike material contained within said supporting means, a plurality of flexible members, each said flexible member being interposed between one of said shoe mounts and said rubberlike material and adapted to transmit pressure from the latter member to said mount, and means for holding said rubberlike member under a predetermined compression, thereby controlling the force with which said shoes are urged into engagement with said shoe-engaging surface, said last-named means comprising a member movable axially with respect to the axis of rotation of said first-named members within one of the latter members and contained within said housing, and an element mounted on the exterior of said housing upon one of said first-named members for varying the axial position of said axially movable member to vary the compression under which said member of yieldable material is held, said shoes being adapted to pivot on said mounts at least about axes substantially perpendicular to their direction of rotation and said lubricant being capable of disengaging said shoes from said surface whenever there is relative rotation between said shoes and said surface.

4. In a device for transmitting torque, a pair of members adapted for rotation with respect to one another about a predetermined axis, one of said members providing a friction surface, means cooperating with said first-named member to provide a fluid-tight housing, said housing containing a lubricant adapted to cover said shoe-engaging surface during operation of said device, a plurality of friction shoes for frictionally engaging said surface, an element fixed to said other member, a plurality of ball mounts carried by said element, each said mount serving as a pivotal mount for one of said shoes, and means carried by said element for biasing said ball mounts in the direction of said shoe-engaging surface to cause said shoes to be pressed into frictional engagement with said surface, said last-named means comprising a member of rubberlike material, a plurality of flexible, platelike members interposed between said member of rubberlike material and said ball mounts and means mounted on said element for holding said member of yieldable material under compression, said shoes being adapted to pivot on said mounts at least about axes substantially parallel to said axis of rotation and said lubricant being capable of disengaging said shoes from said surface whenever there is relative rotation between said shoes and said surface.

5. In a device for transmitting torque, a pair of members adapted for rotation with respect to one another, elements of said members providing a housing for said device, one of said members providing a friction surface on the interior of said housing, means within said housing connected to the other of said members for frictionally engaging said surface, said last-named means comprising a plurality of friction shoes normally in engagement with said surface, a plurality of mounts, each mount pivotally mounting one of said friction shoes, supporting means for said mounts rigidly secured to said other member, a member of rubberlike material contained within said supporting means and a plurality of resilient members, each said resilient member being interposed between one of said shoe mounts and said member of rubberlike material and being adapted to transmit pressure from the latter member to said mount, and compression-applying means carried by said other member and having at least a portion thereof within said housing and in engagement with said member of rubberlike material, said compression-applying means holding said member of rubberlike material under a predetermined compression and thereby controlling the force with which said shoes are urged into engagement with said shoe-engaging surface.

6. The device of claim 5 wherein the compression-applying means comprise a movable element in engagement with the member of rubberlike material, the position of said movable element with respect to said member of rubberlike material being adjustable to vary the compression under which said member of rubberlike material is held.

7. The device of claim 6 wherein the compression-applying means includes a second element mounted on one of said pair of rotary members and accessible from the exterior of said housing for adjusting the position of said movable element with respect to said member of rubberlike material.

8. The device of claim 5 wherein the plurality of resilient members are springs of platelike configuration.

9. The device of claim 8 wherein the plurality of mounts are ball mounts.

10. The device of claim 1 wherein the means for engaging said member of rubberlike material and for holding the same under compression comprise an element extending within the hollow polygonal member for engaging the member of rubberlike material and movable with respect thereto to vary the compression under which said member of rubberlike material is held, and means for engaging said movable element for adjusting the position thereof with respect to said member of rubberlike material.

11. The device of claim 2 wherein each of said plurality of mounts is a ball mount.

12. The device of claim 11 wherein each said resilient member is a plate spring.

OTTO E. WOLFF.

REFERENCES CITED

The following references are of record in the file of this patent:

UNITED STATES PATENTS

| Number | Name | Date |
| --- | --- | --- |
| 122,818 | Ebbitt | Jan. 16, 1872 |
| 1,482,402 | Lamb | Feb. 5, 1924 |
| 1,690,543 | Linderman | Nov. 6, 1928 |
| 2,287,608 | French | June 23, 1942 |
| 2,400,585 | Wolff | May 21, 1946 |
| 2,447,384 | Wolff | Aug. 17, 1948 |

FOREIGN PATENTS

| Number | Country | Date |
| --- | --- | --- |
| 12,697 | Great Britain | Sept. 14, 1889 |